United States Patent
Toyota

(10) Patent No.: US 9,452,651 B2
(45) Date of Patent: Sep. 27, 2016

(54) SUSPENSION MOUNT

(71) Applicant: TOYOTA JIDOSHA KABUSHIKI KAISHA, Toyota-shi, Aichi (JP)

(72) Inventor: Satoru Toyota, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/764,462

(22) PCT Filed: Dec. 4, 2013

(86) PCT No.: PCT/JP2013/082601
§ 371 (c)(1),
(2) Date: Jul. 29, 2015

(87) PCT Pub. No.: WO2014/122842
PCT Pub. Date: Aug. 14, 2014

(65) Prior Publication Data
US 2015/0367699 A1 Dec. 24, 2015

(30) Foreign Application Priority Data

Feb. 6, 2013 (JP) ................................. 2013-021110

(51) Int. Cl.
*B60G 15/08* (2006.01)
*B60G 13/00* (2006.01)
(Continued)

(52) U.S. Cl.
CPC ............. *B60G 15/08* (2013.01); *B60G 13/003* (2013.01); *B60G 2204/128* (2013.01);
(Continued)

(58) Field of Classification Search
CPC B60G 15/08; B60G 13/003; B60G 2206/80; B60G 2204/128; B60G 2204/41; F16F 2228/08; F16F 1/445; F16F 9/54
See application file for complete search history.

(56) References Cited

U.S. PATENT DOCUMENTS 4,434,977 A * 3/1984 Chiba .................. B60G 15/068
188/321.11
4,828,232 A * 5/1989 Harrod ...................... F16F 9/58
188/322.12

(Continued)

FOREIGN PATENT DOCUMENTS

DE 29900342 U1 4/1999
DE 102007026471 A1 12/2008
(Continued)

OTHER PUBLICATIONS

Mar. 31, 2016 Extended European Search Report issued in European Application No. 13874462.8.

*Primary Examiner* — Drew Brown
(74) *Attorney, Agent, or Firm* — Oliff PLC

(57) ABSTRACT

A suspension mount comprises an inner plate, an elastomer member, a lower case, and an upper plate. A plate includes an extended portion extending from the circular-cylinder portion. An incline portion is integrally formed on the extended portion and clamped by the elastomer member. The elastomer member clamps the incline portion of the extended portion from the outer periphery side. Thereby, when the plate is fixed in a status that the plate and the elastomer member are contained in the case, the input in the axial direction of the mount will be decomposed into a compressive load in an axial direction and a compressive load in an axially-perpendicular direction by the incline portion. Therefore, the elastomer member is held in a status that it is precompressed in the axial direction and the axially-perpendicular direction.

7 Claims, 9 Drawing Sheets

(51) Int. Cl.
*F16F 9/54* (2006.01)
*F16F 1/44* (2006.01)

(52) U.S. Cl.
CPC ...... *B60G 2204/41* (2013.01); *B60G 2206/80* (2013.01); *F16F 1/445* (2013.01); *F16F 9/54* (2013.01); *F16F 2228/08* (2013.01)

(56) References Cited

U.S. PATENT DOCUMENTS

| | | | |
|---|---|---|---|
| 6,640,942 B2 * | 11/2003 | Wakita | B60G 13/003 188/321.11 |
| 7,350,779 B2 * | 4/2008 | Tamura | B60G 13/003 188/321.11 |
| 8,556,047 B2 * | 10/2013 | Kondou | F16F 9/065 188/283 |
| 8,960,696 B2 * | 2/2015 | McMullen | B60G 15/067 267/220 |
| 9,132,709 B2 * | 9/2015 | Endo | B60G 15/06 |
| 2005/0133322 A1 * | 6/2005 | Huprikar | B60G 13/003 188/321.11 |
| 2005/0155829 A1 * | 7/2005 | Germano | B60G 13/003 188/321.11 |
| 2006/0151928 A1 | 7/2006 | Tamura | |
| 2008/0001336 A1 * | 1/2008 | Groves | B60G 3/20 267/221 |

FOREIGN PATENT DOCUMENTS

| | | |
|---|---|---|
| JP | 2006-219106 A | 8/2006 |
| JP | 2007-100889 A | 4/2007 |
| JP | 2010-090995 A | 4/2010 |
| JP | 2010-281412 A | 12/2010 |
| JP | 2011-174563 A | 9/2011 |

* cited by examiner (a) Beginning of Compression (b) Completion of Compression (c) Completion of Compression
    (Specimen for Reference)

(a)

AI: Angle of INclination
CL: Compression Load (b)

(a)

(b)

(a)

(b)

(a)

(b)

AI: Angle of INclination
CL: Compression Load (a) No Load Status  (b) Precompressed Status NR: Necessary Region
UR: Unnecessary Region

SUSPENSION MOUNT

TECHNICAL FIELD

The present invention relates to a suspension mount which connects with a vehicle body a suspension member which constitutes a suspension mechanism of the vehicle.

BACKGROUND ART

Conventionally, a strut mount as shown in the following patent document 1 (PTL1) is known, for example. This conventional strut mount comprises an inside clasp attached to a piston rod and an outside clasp connected with the inside clasp through an elastic member. Here, the elastic member used for this conventional strut mount consists of a first rubber and a second rubber with a dynamic multiplication, which is a ratio of a spring constant under a dynamic load to a spring constant under a static load, and a damping characteristic tan 6 larger than those of the first rubber. The first rubber and the second rubber are integrally attached at least to the inside clasp, and the first rubber is configured to contact with the faceplate portion of the outside clasp under an overall range of load including no load, and the second rubber is configured to contact with the faceplate portion of the outside clasp only under a load exceeding a predetermined value.

Moreover, conventionally, a strut mount as shown in the following patent document 2 (PTL2) is also known. This conventional strut mount comprises an inner cylinder fixed at the end of a piston rod of a shock absorber, a vibration-isolation substrate consisting of a rubber-like elastic object disposed in this inner cylinder and a pair of upper and lower brackets which forms a housing portion for containing this vibration-isolation substrate and is fixed to the vehicle body side by a plurality of mounting members.

Moreover, conventionally, a strut mount as shown in the following patent document 3 (PTL3) is also known, for example. This conventional strut mount comprises an outer member, an inner mounting member and an elastic object, and the elastic object consists of a rubber elastic portion and a low-density portion. This rubber elastic portion is cure-adhered to the inner mounting member, and its upper surface and lower surface are formed in a shape of a wave which has amplitude in an axial direction of the strut mount. The low-density portion is formed of an expandable urethane and a soft rubber, etc., for example.

Furthermore, conventionally, a strut mount as shown in the following patent document 4 (PTL4) is also known, for example. This conventional strut mount comprises an outside clasp attached to a vehicle body, an inside clasp attached to a piston rod of a shock absorber, and a rubber elastic object interposed between the outside clasp and the inside clasp by being pressed into a housing portion of the outside clasp in a status that it is formed integrally with the inside clasp at the outer periphery of the inside clasp. This conventional strut mount is configured so that a soft layer (urethane) with a higher loss coefficient and a lower density than those of the rubber elastic object is interposed between the outside clasp and the rubber elastic object and thereby the soft layer absorbs a minute high-frequency oscillation and the rubber elastic object absorbs a big external force.

CITATION LIST

Patent Literature

[PTL1] Japanese Patent Application Laid-Open (kokai) No. 2010-281412

[PTL2] Japanese Patent Application Laid-Open (kokai) No. 2006-219106

[PTL3] Japanese Patent Application Laid-Open (kokai) No. 2010-90995

[PTL4] Japanese Patent Application Laid-Open (kokai) No. 2007-100889

SUMMARY OF INVENTION

By the way, in the conventional strut mounts shown in the above-mentioned patent documents 1 and 2 (PTLs 1 and 2), an elastic member and/or a vibration-isolation substrate mainly consisting of a rubber material are adopted. Here, the rubber material can usually demonstrate an elastic force promptly against a deformation accompanied by an input. For this reason, when a strut mount which adopts an elastic member and/or a vibration-isolation substrate mainly consisting of a rubber material connects a suspension member, such as a shock absorber, with a vehicle body, the elastic member and the vibration-isolation substrate can generate an elastic force for controlling displacements of the vehicle in a up-and-down, front-and-rear and left-and-right directions in the shock absorber, etc., promptly against these displacements (upon the initiation of these displacements). Therefore, a strut mount which adopts an elastic member and a vibration-isolation substrate mainly consisting of the above-mentioned rubber material can demonstrate an elastic force suitable for a suspension member not only against a displacement of a vehicle in a up-and-down direction, but also against displacements of the vehicle in a front-and-rear and left-and-right directions. In other words, the strut mount is configured to be able to demonstrate a suitable characteristic (spring constant).

However, an elastic member and vibration-isolation substrate mainly consisting of a rubber material are attached to an inside clasp or inner cylinder (strut mount) in a status that they have a desired characteristic (spring constant) through what is called a cure-adhesion. Therefore, a process for the cure-adhesion of the elastic member and/or vibration-isolation substrate is needed separately. In this connection, elastomeric materials, such as an expandable urethane etc. adopted as a low-density portion and/or soft layer in the conventional strut mounts disclosed in the above-mentioned patent documents 3 and 4 (PTLs 3 and 4), do not need a cure-adhesion process, and can be attached to a strut mount after being formed in a predetermined shape beforehand.

Here, an expandable urethane etc. which is an elastomeric material, demonstrates an elastic force promptly against a deformation accompanied by an input. In other words, since it has a desired characteristic (spring constant), it is important to be maintained at a status that it is compressed to a predetermined compressibility beforehand (a precompressed status), as shown in FIG. 8. Namely, as shown in FIG. 8, in a no load status (a) that it is not precompressed, an unnecessary region where an elastic force does not increase against an increasing displacement (stroke) appears in an early period after an input was started, and thereafter a necessary region where an elastic force increases against an increasing displacement (stroke) appears. Therefore, in the status with no precompression, since a useless displacement (stroke) occurs in the unnecessary region, a total displacement (stroke) becomes large and an elastic force cannot be generated with a sufficient responsibility. On the other hand, in a precompressed status (b) that it is precompressed, the necessary region where an elastic force increases against an increasing displacement (stroke) appears from the early period after an input was started.

Namely, in the precompressed status, since the necessary region can be generated from an early period of the input, a total displacement (stroke) becomes small and an elastic force can be generated with a sufficient responsibility.

Based on such a characteristic, when the above-mentioned elastic member and/or vibration-isolation substrate is formed only of an elastomeric material which consists of an expandable urethane, etc. and is held being compressed (precompressed) between an inside clasp and an outside clasp and/or between an inner cylinder and a bracket, for instance, the elastic member and/or vibration-isolation substrate can demonstrate an elastic force with a sufficient responsibility against a displacement in an axial direction of a shock absorber connected with a strut mount, etc. (for instance, in a up-and-down direction of the vehicle). In other words, the strut mount can demonstrate a suitable characteristic (spring constant).

On the other hand, an elastomeric material such as an expandable urethane, in spite of the presence or absence of the above-mentioned precompression, an elastic force can be generated also by enlarging a pressure receiving area, as shown in FIG. 9. Namely, as shown in FIG. 9, although a status that an elastic force does not increase against an increasing displacement (stroke) after an input is started continues in the case where the pressure receiving area is A0, an elastic force increases against an increasing displacement (stroke) after an input is started in a case where the pressure receiving area is A1 which is larger than the pressure receiving area A0. Namely, an elastic force can be generated from an early period of an input (early period of a stroke) by enlarging a pressure receiving area.

Here, when an elastic member and/or vibration-isolation substrate formed only of an elastomeric material consisting of an expandable urethane, etc. are compressed (precompressed) and held between an inside clasp and an outside clasp and/or between an inner cylinder and a bracket, a status that the elastic member and/or vibration-isolation substrate are precompressed in an axial direction of a shock absorber, etc., i.e. an axial direction of the inside clasp and an inner cylinder can be secured, as mentioned above. However, since the elastic member and/or vibration-isolation substrate cannot be precompressed in an axially-perpendicular direction which is a direction perpendicular to the axial direction of the inside clasp and/or inner cylinder, an elastic force cannot be given with a sufficient responsibility against a displacement in the axially-perpendicular direction of the shock absorber, etc. (for instance, in front-and-rear and left-and-right directions of a vehicle). Therefore, in order to give an elastic force against a displacement in the axially-perpendicular direction of the shock absorber, etc., i.e. the inside clasp and/or inner cylinder (in the front-and-rear and left-and-right directions of the vehicle), it can be supposed to increase the area of a contact portion with the elastic member and/or vibration-isolation substrate in the axial direction of the inside clasp and/or inner cylinder, i.e., the pressure receiving area. Specifically, it can be supposed to cylindrically extend the elastic member and/or vibration-isolation substrate along the axial direction of the strut mount (shock absorber, etc.).

However, as apparent from FIG. 8 and FIG. 9, even if a pressure receiving area is enlarged, when an elastic member and/or vibration-isolation substrate is not precompressed, it is difficult to give a suitable elastic force with a sufficient responsibility against a displacement in an axially-perpendicular direction of a shock absorber, etc. (in front-and-rear and left-and-right directions of a vehicle). Therefore, in a conventional strut mount, since an elastic member and/or vibration-isolation substrate, etc. formed only of an elastomeric material can be precompressed only in a specific direction (axial direction of a shock absorber, etc.), it is difficult to demonstrate a suitable characteristic (spring constant) in an axial direction and an axially-perpendicular direction, and its adoption to vehicles may be limited. Moreover, when a pressure receiving area is enlarged in order to demonstrate the characteristic against the displacement in the axially-perpendicular direction, this leads to an enlargement of the dimension (height dimension) of a strut mount in its axial direction, and this may affect a configuration of various mechanisms aiming at pedestrian protection, for example, especially in a case where the strut mount is arranged in the front portion of a vehicle.

The present invention has been made in order to cope with the above-mentioned issues, and one of the objectives thereof is to provide a small suspension mount which adopts an expandable resin elastomer comprising an expandable resin as an elastomer and can give a suitable'elastic force against a displacement of the suspension member connected therewith.

In order to achieve the above-mentioned objective, a feature of the present invention is in that a suspension mount which connects with a vehicle body a suspension member constituting a suspension mechanism of the vehicle comprises an inside member connected with said suspension member, an expandable resin elastomer which clamps an extended portion formed of an expandable resin and extended from said inside member, a case member which has a containing portion for integrally containing said inside member and said expandable resin elastomer, a plate member which is integrally adhered to an opening end of said case member and has a compression surface for compressing said expandable resin elastomer contained inside of said containing portion of said case member, along with a bottom inner surface of said case member, in a status that said expandable resin elastomer clasps said extended portion of said inside member, and a compressing measure for compressing said expandable resin elastomer in an extending direction of said extended portion of said inside member in association with the compression of said expandable resin elastomer by said bottom inner surface of said case member and said compression surface of said plate member. In this case, said suspension member is a shock absorber, for example, and said inside member is connected with an absorber rod of this shock absorber.

Moreover, in these cases, said compressing measure may be configured to comprise an incline portion formed at least on one side of clamped surfaces of said extended portion of said inside member, which are clamped by said expandable resin elastomer. And in this case, said incline portion may be formed so that its thickness becomes thinner towards the outer edge of said extended portion in an extending direction of said extended portion.

In these cases, when said incline portion is formed at least on the clamped surface opposed to said compression surface of said plate member among said clamped surfaces of said extended portion, said compressing measure may be configured to further comprise a plate member side incline potion formed on said compression surface of said plate member. In this case, said plate member side incline portion may be formed so that its thickness becomes thicker towards the outer edge of said extended portion in an extending direction of said extended portion.

Moreover, in these cases, when said incline portion is formed at least on the clamped surface opposed to said bottom inner surface of said case member among said clamped surfaces of said extended portion, said compressing measure may be configured to further comprise a case member side incline potion formed on said bottom inner surface of said case member. In this case, said case member side incline portion may be formed so that its thickness becomes thicker towards the outer edge of said extended portion, to which said case member side incline portion is opposed, in an extending direction of said extended portion.

Furthermore, in these cases, said pressing measure may compress said expandable resin elastomer to different compression states along the circumference direction of said inside member. In this case, specifically, said expandable resin elastomer can be compressed to different compression states by changing the angle of inclination of said incline portion formed on said extended portion of said inside member along the circumference direction of said inside member. Moreover, said expandable resin elastomer can be compressed to different compression states by changing the angle of inclination of said plate member side incline portion formed on said compression surface of said plate member along the circumference direction of said inside member. Furthermore, said expandable resin elastomer can be compressed to different compression states by changing the angle of inclination of said case member side incline potion formed on said bottom inner surface of said case member along the circumference direction of said inside member. In these cases, said compressing measure can compress said expandable resin elastomer to different compression states along the circumference direction of said inside member, depending on the extent of an elastic force required for a displacement of said suspension member connected with said inside member in front-and-rear and left-and-right directions of a vehicle.

In accordance with the above, the suspension mount using an expandable resin elastomer can comprise a compression means, specifically an incline portion, for compressing the expandable resin elastomer in the extending direction of the extended portion of the inside member. Thereby, the compressing measure can generate a compressive load by compressing said expandable resin elastomer also in the extending direction of the extended portion of the inside member, in association with the compression of the expandable resin elastomer by the bottom inner surface of the case member and the compression surface of the plate member (i.e., in association with the generation of a compressive load). Therefore, the expandable resin elastomer can be held in a status that it is precompressed in an axial direction of the suspension mount and in an axially-perpendicular direction which is a direction perpendicular to this axial direction (the extending direction of the extended portion of the inside member), for example. Thereby, when a shock absorber which is the suspension member connected with the vehicle body through the suspension mount is displaced (vibrates) in the up-and-down, front-and-rear and left-and-right directions of the vehicle, the expandable resin elastomer in a precompressed status can give a desired elastic force with a sufficient responsibility. As a result, the suspension mount can demonstrate a desired characteristic and can properly control the displacement of the shock absorber. Namely, it becomes possible for the suspension mount to control a vibration characteristic between a wheel and the vehicle body not only in the axial direction, but also in the axially-perpendicular direction (in the extending direction of the extended portion of the inside member).

Moreover, by the compressing measure, a compressive load can be generated also in the axially-perpendicular direction (the extending direction of the extended portion of the inside member) to precompress the expandable resin elastomer. For this reason, it is not necessary to enlarge a pressure receiving area with the expandable resin elastomer in the axial direction of the inside member, and it is not necessary to increase the dimension in the height direction of the suspension mount. Therefore, the suspension mount can be miniaturized while securing a desired characteristic.

Furthermore, as the expandable resin, an elastomeric material (polyurethane elastomer foam) can be adopted, for example. Thereby, the expandable resin elastomer can be easily formed in a desired shape, and it is not necessary to include a process of a cure-adhesion in an assembly of the suspension mount, unlike a rubber material. Therefore, easy processing can be secured while a manufacturing cost can be reduced.

DESCRIPTION OF EMBODIMENTS

Figure 1:
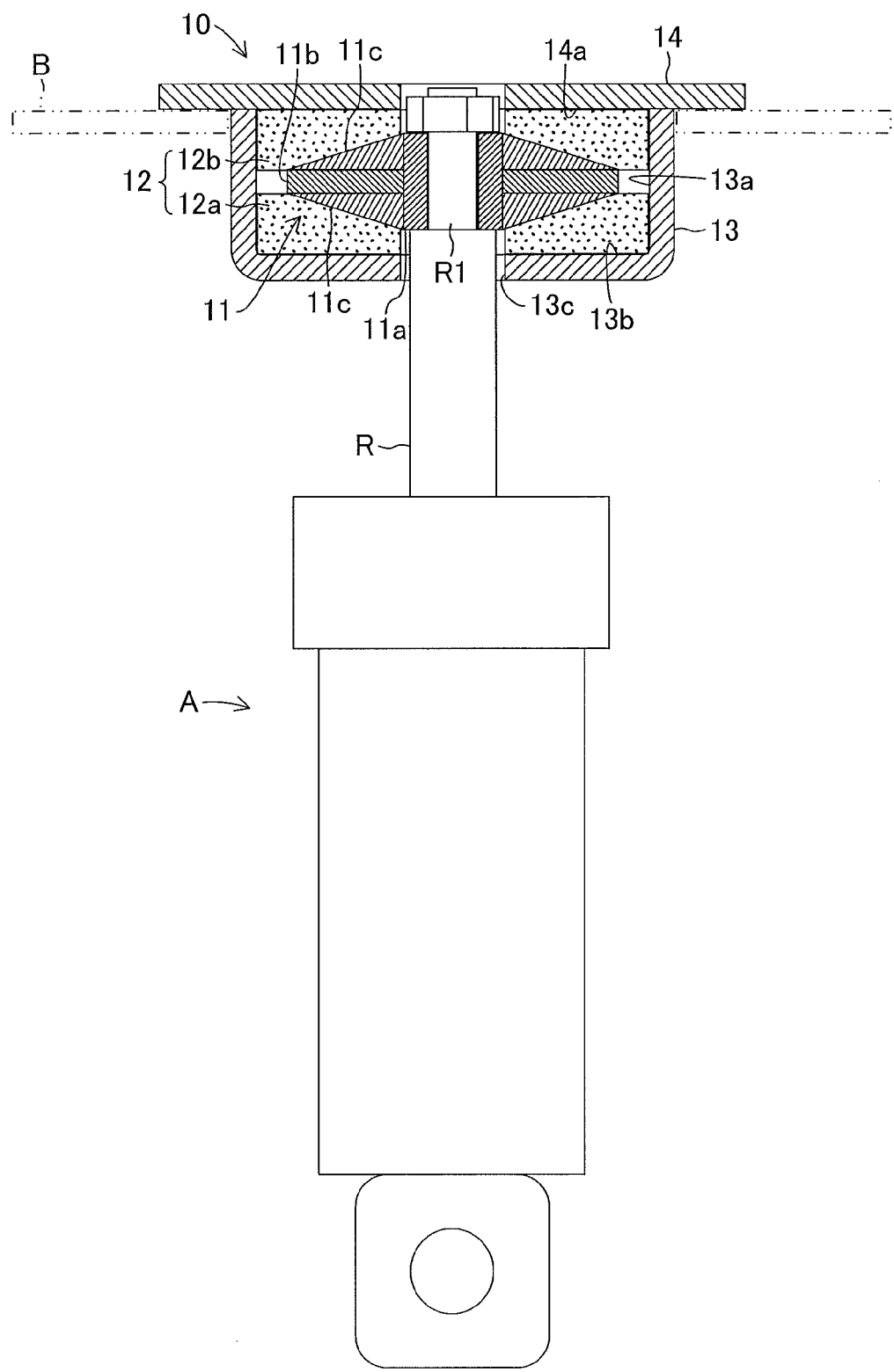
FIG. 1 is a sectional view for showing the configuration of a suspension mount according to an embodiment of the present invention in detail.

Hereafter, a suspension mount according to an embodiment of the present invention will be explained using drawings. FIG. 1 is a sectional view for showing roughly the configuration of a suspension member which constitutes a suspension mechanism of a vehicles, specifically a suspension mount 10 which connects with a vehicle body B a shock absorber A constituting a strut-type suspension mechanism, according to one embodiment of the present invention. Here, the suspension mount 10 in this embodiment is attached to the front side fender apron of the vehicle body B, etc. through a volt, and is used as an upper mount which connects the shock absorber A with the vehicle body B, for example.

The suspension mount 10 is constituted by an inner plate 11 as a inside member, an elastomer member 12 as an expandable resin elastomer, a lower case 13 as a case member, and an upper plate 14 as a plate member, as shown in FIG. 1.

The inner plate 11 is connected with the shock absorber A, and has a cylinder portion 11a made of metal and an annular extended portion 11b which extends outwards in a radial direction from the outer periphery surface of the cylinder portion 11a. The cylinder portion 11a is connected with the shock absorber A by a nut being screwed on a screw part formed at a tip portion R1 of an absorber rod of the shock absorber A in a status that the tip portion R1 is inserted in the cylinder portion. In addition, although the inner plate 11 has the cylinder portion 11a in this embodiment, the cylinder portion 11a can be omitted if the inner plate 11 can be connected with the absorber rod R of the shock absorber A.

The extended portion 11b is clamped by the elastomer member 12. And an incline portion 11c which constitutes a compressing measure is integrally formed in the extended portion 11b of the inner plate 11. Specifically, the incline portion 11c in this embodiment is formed in a tapered shape around its whole circumference with a thickness decreasing towards the outer edge of the extended portion 11b in an extending direction of the extended portion 11b, i.e., outwards in a radial direction from the center of the inner plate 11. Therefore, it is also possible to integrally form the incline portion 11c by decreasing the board thickness of the extended portion 11b in its extending direction, for example.

The elastomer member 12 is constituted by the first elastomer member 12a and the second elastomer member 12b, as shown in FIG. 1. Here, the elastomer member 12 (the first elastomer member 12a and the second elastomer member 12b) which is an expandable resin elastomer can be formed using a foamed object of a polyurethane elastomer as an expandable resin. In addition, in this embodiment, for example, in consideration of an attachment property and a desired characteristic (spring constant after attachment), etc., the elastomer member 12 is constituted by the first elastomer member 12a and the second elastomer member 12b with predetermined thicknesses. However, it is needless to say that the elastomer member 12 does not have to be divided.

The lower case 13 is made of metal and is formed in a bottomed cylindrical shape whose cross-section shape is approximately U-shaped to form a containing portion 13a, as shown in FIG. 1. The containing portion 13a contains the first elastomer member 12a, the inner plate 11 and the second elastomer member 12b in order. Moreover, the through-hole 13c, in which the absorber rod R of the shock absorber A to be connected with the inner plate 11 is inserted, is formed in a bottom inner surface 13b which forms the containing portion 13a.

The upper plate 14 is a thin plate made of metal, and is integrally adhered to the opening end of the lower case 13 in a status that the first elastomer member 12a, the inner plate 11 and the second elastomer member 12b are contained in order in the containing portion 13a of the lower case 13, as shown in FIG. 1. Thus, the upper plate 14 is integrally adhered to the lower case 13 and thereby a portion of the upper plate 14, which contacts with the second elastomer member 12b, i.e., a compression surface 14a, and the bottom inner surface 13b of the lower case 13 compresses the first elastomer member 12a and the second elastomer member 12b which clamp the incline portion 11c formed in the extended portion 11b of the inner plate 11 and are contained within the containing portion 13a to a predetermined compressibility.

Figure 2:
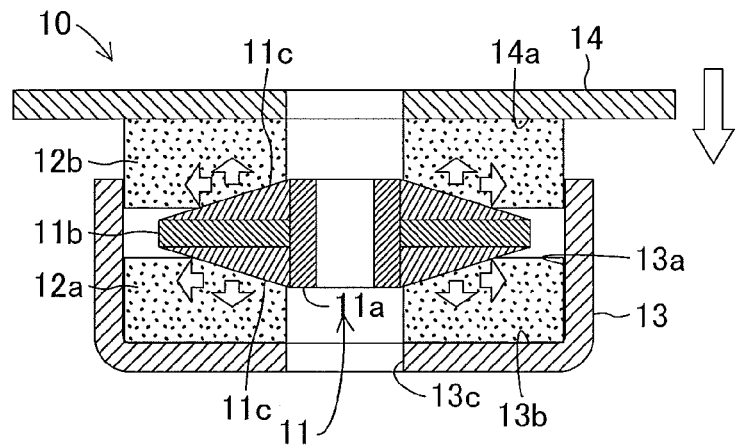
FIG. 2 is an expanded sectional view for explaining the compression state of an elastomer member in the suspension mount shown in FIG. 1.
Figure 2:
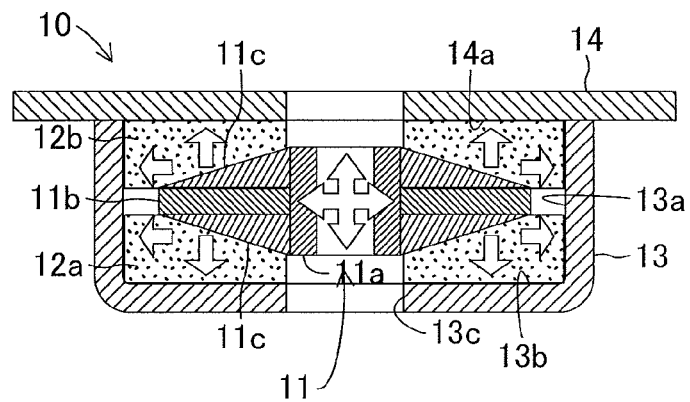
Figure 2:
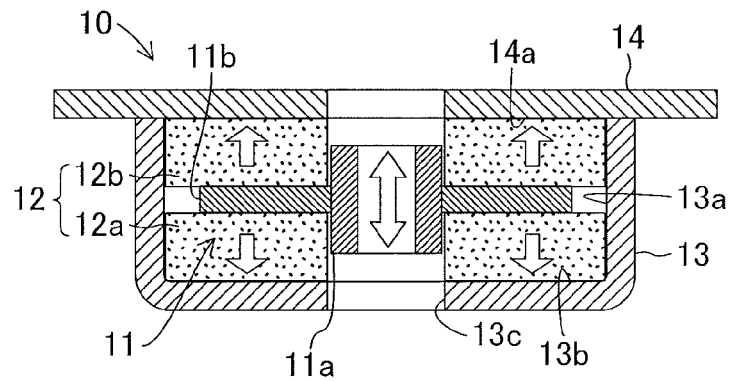

The compression of the first elastomer member 12a and the second elastomer member 12b accompanying attachment of this upper plate 14 to the lower case 13 will be concretely explained below using FIG. 2. The first elastomer member 12a and the second elastomer member 12b are formed so that it has a predetermined thickness in a no-load status, based on its desired characteristic (spring constant) after attachment, i.e., in a precompressed status. For this reason, as shown in FIG. 2 (a), at the beginning of compression, the thicknesses of the first elastomer member 12a and the second elastomer member 12b are large, and they are gradually compressed with a displacement of the upper plate 14 (in FIG. 2, it descends toward the bottom of the plane of drawing).

At this time, the first elastomer member 12a and the second elastomer member 12b are compressed in a status that they clamp the incline portion 11c integrally formed in the extended portion 11b of the inner plate 11. For this reason, by the incline portion 11c in contact with the second elastomer member 12b, the downward input which acts on the second elastomer member 12b with a displacement (descent) of the compression surface 14a in the upper plate 14 is decomposed into a compressive load in the axial direction of the suspension mount 10 (in FIG. 2, it is a direction toward the top of the plane of drawing) and a compressive load in an axially-perpendicular direction which is perpendicular to the axial direction (in FIG. 2, it is a left-and-right direction, and corresponds to the extending direction of the extended portion 11b of the inner plate 11 in this embodiment).

On the other hand, an upward input acts on the first elastomer member 12a from the bottom inner surface 13b of the lower case 13, as a reaction force accompanying a displacement (descent) of the compression surface 14a in the upper plate 14. For this reason, by the incline portion 11c in contact with the first elastomer member 12a, the upward input which acts on the first elastomer member 12a is decomposed into a compressive load in the axial direction of the suspension mount 10 (in FIG. 2, it is a direction toward the bottom of the plane of drawing) and a compressive load in an axially-perpendicular direction which is perpendicular to the axial direction (in FIG. 2, it is a left-and-right direction, and corresponds to the extending direction of the extended portion 11b of the inner plate 11 in this embodiment).

And when the compression is completed by a displacement (descent) of the compression surface 14a in the upper plate 14 as shown in (b), a suitable compressibility in the axial direction of the first elastomer member 12a and the second elastomer member 12b will be secured. Thereby, respectively on the first elastomer member 12a and the second elastomer member 12b, while a compressive load acts in an up-and-down axial direction, a compressive load acts in a left-and-right axially-perpendicular direction (the extending direction of the extended portion 11b of the inner plate 11). Therefore, for example, in a case where the shock absorber A is connected with the vehicle body B through this suspension mount 10, when the shock absorber A, in other words, the inner plate 11 integrally connected therewith, is displaced (vibrates) in the up-and-down, front-and-rear and left-and-right directions of the vehicle, the first elastomer member 12a and the second elastomer member 12b (elastomer member 12) in a precompressed status can give a suitable elastic force with a sufficient responsibility against the above-mentioned displacement of the inner plate 11 (shock absorber A). Namely, the suspension mount 10 can demonstrate a suitable characteristic (spring constant) against the displacement of the shock absorber A in the up-and-down, left-and-right and front-and-rear directions of the vehicle.

Here, for reference, a conventional-type suspension mount 10 wherein an incline portion 11c is not formed in the inner plate 11 is supposed as a specimen for reference, and the precompressed status of the first elastomer member 12a and the second elastomer member 12b in this supposed suspension mount 10 (specimen for reference) will be explained. As for the suspension mount 10 wherein the incline portion 11c is not formed in the inner plate 11 like a conventional type, as shown in FIG. 2 (c), only a compressive load in an up-and-down axial direction acts on the first elastomer member 12a and the second elastomer member 12b with a displacement (descent) of the compression surface 14a in the upper plate 14. Namely, in such a suspension mount 10, the first elastomer member 12a and the second elastomer member 12b are in a status that they are precompressed only in the axial direction and are not precompressed in an axially-perpendicular direction at all. For this reason, for example, although they can give a suitable elastic force with a sufficient responsibility only against a displacement of the inner plate 11 (shock absorber A) in the up-and-down direction of the vehicle, an elastic force cannot be demonstrated against a displacement of the inner plate 11 (shock absorber A) in the left-and-right and front-and-rear directions of the vehicle.

As can be understood from the above explanation, in accordance with the above-mentioned embodiment, in the suspension mount 10 using the elastomer member 12 (the first elastomer member 12a and the second elastomer member 12b) as an expandable resin, the incline portion 11c which constitutes a compressing measure can be formed in the extended portion 11b of the inner plate 11. Thereby, while the elastomer member 12 (the first elastomer member 12a and the second elastomer member 12b) generates a compressive load in the axial direction of the suspension mount 10 (shock absorber A), it can generate a compressive load also in the axially-perpendicular direction (the extending direction of the extended portion 11b of the inner plate 11). Therefore, the elastomer member 12 (the first elastomer member 12a and the second elastomer member 12b) can be held in a state that it is precompressed in the axial direction and the axially-perpendicular direction. Thereby, when the shock absorber A connected with the vehicle body B through the suspension mount 10 is displaced (vibrates) in the up-and-down, left-and-right and front-and-rear directions of the vehicle, the elastomer member 12 (the first elastomer member 12a and the second elastomer member 12b) can give a desired elastic force with a sufficient responsibility and, as a result, the suspension mount 10 can demonstrate a desired characteristic and can properly control the displacement of the shock absorber A. Namely, it becomes possible for the suspension mount 10 to control the vibration characteristic between a wheel and the vehicle body B not only in the axial direction, but also in the axially-perpendicular direction (the extending direction of the extended portion 11b of the inner plate 11).

Moreover, by forming the incline portion 11c as a compressing measure, a compressive load is generated and a precompression can be carried out also in the axially-perpendicular direction. For this reason, it is not necessary to enlarge a pressure receiving area with the elastomer member 12 (the first elastomer member 12a and the second elastomer member 12b) in the axial direction of the inner plate 11, and it is not necessary to increase the dimension in the height direction of the suspension mount 10. Therefore, the suspension mount 10 can be miniaturized while securing a desired characteristic.

Furthermore, an elastomeric material (foamed object of a polyurethane elastomer) can be employed as an expandable resin. Thereby, the elastomer member 12 (the first elastomer member 12a and the second elastomer member 12b) can be easily formed into a desired shape and, unlike a rubber material, it is not necessary to include a cure-adhesion process in an assembly of the suspension mount 10. Therefore, easy processing can be secured while a manufacturing cost can be reduced.

<First Modification>

As mentioned in the above-mentioned embodiment, the incline portion 11c integrally formed in the extended portion 11b of the inner plate 11 can generate a compressive load in the axially-perpendicular direction (the extending direction of the extended portion 11b of the inner plate 11) against the first elastomer member 12a and the second elastomer member 12b, while the bottom inner surface 13b of the lower case 13 and the compression surface 14a of the upper plate 14 can generate a compressive load in the axial direction. By the way, for controlling the displacement (vibration) of the shock absorber A connected with the inner plate 11 in the front-and-rear and left-and-right directions of the vehicle, it is desirable that the elastic force (spring constant) which the first elastomer member 12a and the second elastomer member 12b generate can be arbitrarily changed depending on the demand from a viewpoint of securing performance of a suspension mechanism, for example.

In this case, as mentioned above, the elastic force (spring constant) which the first elastomer member 12a and the second elastomer member 12b generate depends on the precompressed status, i.e., the extent of the compressive load which the incline portion 11c formed on the extended portion 11b of the inner plate 11 acts in the axially-perpendicular direction (extending direction of the extended portion 11b of the inner plate 11). Here, the extent of the compressive load in the axially-perpendicular direction, which acts on the first elastomer member 12a and the second elastomer member 12b, changes according to the extent of the angle of inclination of the incline portion 11c.

Figure 3:
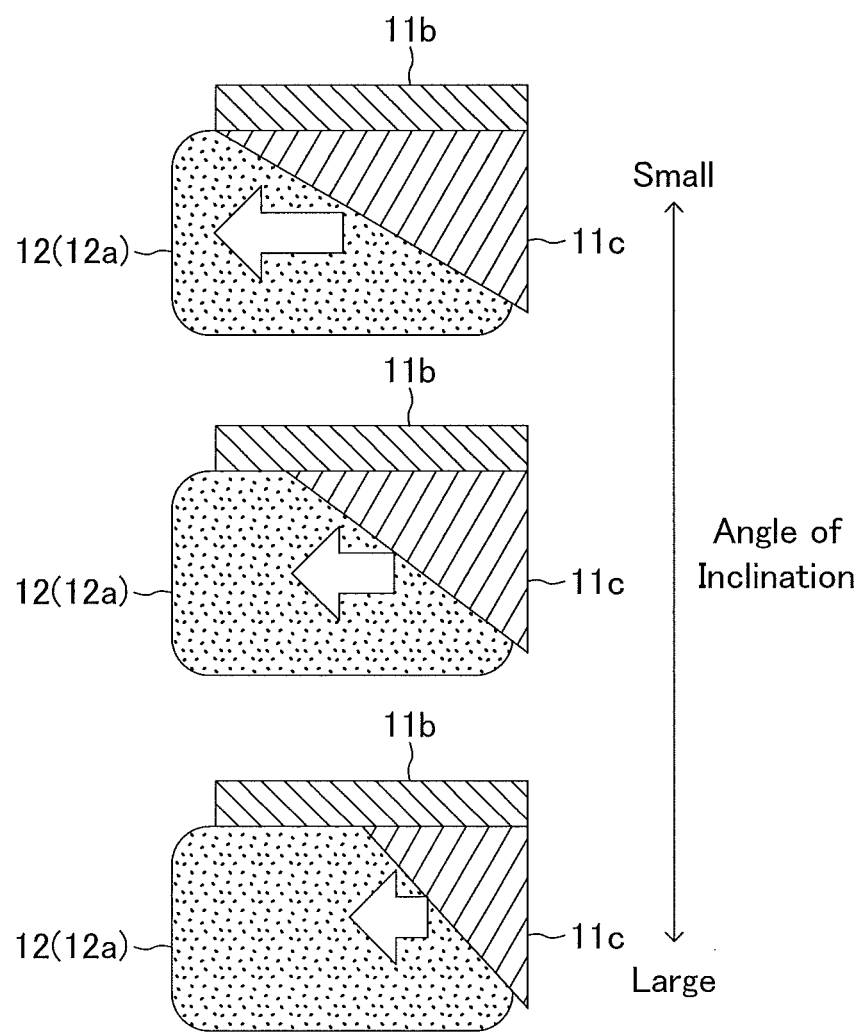
FIG. 3 is a view for explaining a change of a compressive load accompanying a change of the angle of inclination in an incline portion in an inner plate, according to the first modification of the embodiment of the present invention.

Namely, as shown in FIG. 3, the smaller the angle of inclination of the incline portion 11c becomes, the larger the region which contacts and compresses the elastomer member 12 (the first elastomer member 12a) becomes, and the larger input can act as a compressive load in the axially-perpendicular direction (the extending direction of the extended portion 11b of the inner plate 11). And, the larger the angle of inclination of the incline portion 11c becomes, the smaller the region which contacts and compresses the elastomer member 12 (the first elastomer member 12a) becomes, and the smaller input can act as a compressive load in the axially-perpendicular direction (the extending direction of the extended portion 11b of the inner plate 11).

Therefore, the extent of the compressive load which acts on the elastomer member 12 (the first elastomer member 12a and the second elastomer member 12b) in the axially-perpendicular direction (the extending direction of the extended portion 11b of the inner plate) can be changed by suitably changing the angle of inclination of the incline portion 11c. Thereby, the precompressed status in the elastomer member 12 (the first elastomer member 12a and the second elastomer member 12b) can be properly changed, and the elastic force (spring constant) which the elastomer member 12 (the first elastomer member 12a and the second elastomer member 12b) generates can be arbitrarily changed.

<Second Modification>

Figure 4:
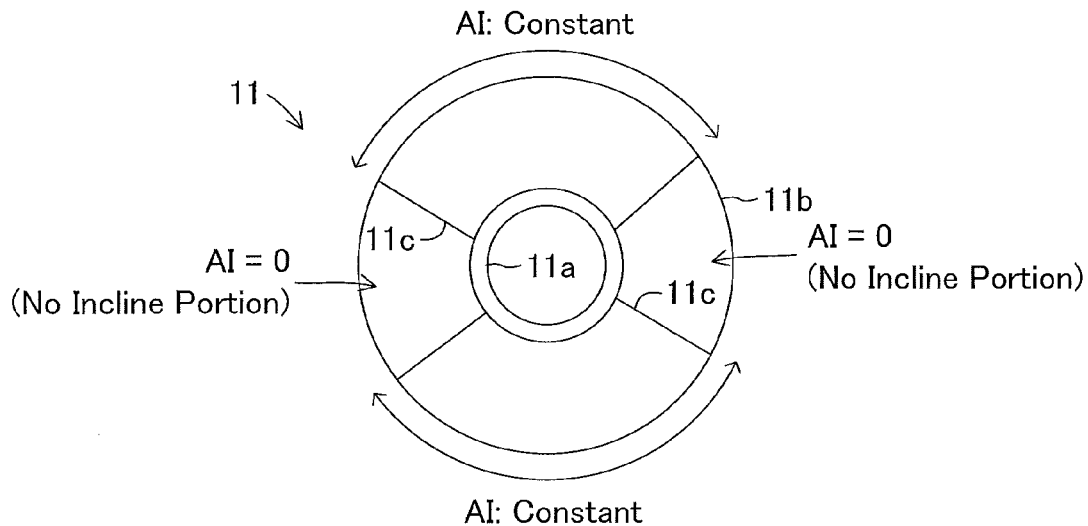
FIG. 4 is a view for explaining an arrangement of an incline portion (presence or absence of an incline portion) and a continuous change of the angle of inclination of the incline portion in an inner plate, according to the second modification of the embodiment of the present invention.
Figure 4:
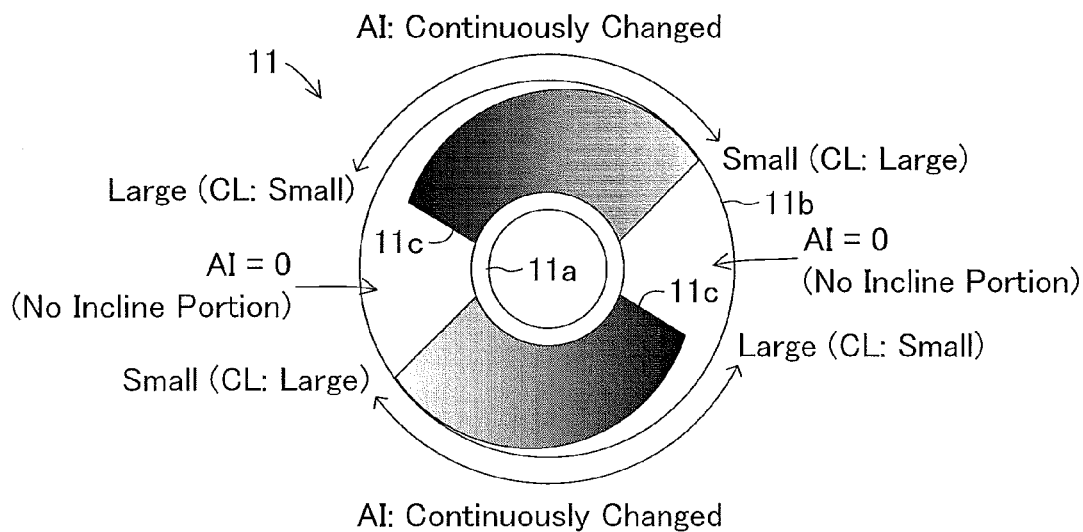

In the above-mentioned embodiment and the above-mentioned first modification, the incline portion 11c was formed around the whole circumference of the annular extended portion 11b of the inner plate 11. In this case, as shown in FIG. 4 (a), it is also possible to form the incline portion 11c in an arbitrary location on the circumference of the annular extended portion 11b.

Namely, in the location in which the incline portion 11c is formed, the elastomer member 12 (the first elastomer member 12a and the second elastomer member 12b), in a status that they are clamping the incline portion 11c, is compressed. Thereby, as mentioned above, a compressive load in the axially-perpendicular direction (the extending direction of the extended portion 11b of the inner plate 11) acts on the elastomer member 12 (the first elastomer member 12a and the second elastomer member 12b) by the incline portion 11c. On the other hand, in the location in which the incline portion 11c is not formed, in other words, the angle of inclination is set to "0", the elastomer member 12 (the first elastomer member 12a and the second elastomer member 12b), in a status that they are clamping the extended portion 11b, is compressed. Thereby, a compressive load acts on the elastomer member 12 (the first elastomer member 12a and the second elastomer member 12b) only in the axial direction, like the above-mentioned specimen for reference. That is, in this case, the location (direction) in which a compressive load acts on the elastomer member 12 (the first elastomer member 12a and the second elastomer member 12b) in the axial direction and the axially-perpendicular direction (the extending direction of the extended portion 11b of the inner plate 11) and the location (direction) in which a compressive load act thereon only in the axial direction can be distinguished.

Moreover, the angle of inclination of the incline portion 11c can be changed, like the above-mentioned first modification. In this case, as shown in FIG. 4 (b), it is also possible to form the incline portion 11c in an arbitrary location on the circumference of the annular extended portion 11b (including the case where the incline portion 11c is formed around the whole circumference) and continuously change the angle of inclination of this incline portion 11c in the circumference direction.

Namely, in the location in which the incline portion 11c is formed, the elastomer member 12 (the first elastomer member 12a and the second elastomer member 12b) is compressed, in a status that they are clamping the incline portion 11c with its angle of inclination changes continuously. For this reason, the incline portion 11c makes the compressive load whose extent changes continuously in the circumference direction act on the elastomer member 12 (the first elastomer member 12a and the second elastomer member 12b) in the axial direction and the axially-perpendicular direction (the extending direction of the extended portion 11b of the inner plate 11), respectively. On the other hand, in the location in which the incline portion 11c is not formed, in other words, the angle of inclination is set to "0", the elastomer member 12 (the first elastomer member 12a and the second elastomer member 12b) in a status that they are clamping the extended portion 11b is compressed. For this reason, a compressive load acts on the elastomer member 12 (the first elastomer member 12a and the second elastomer member 12b) only in the axial direction. Namely, in this case, the compressive load which continuously changes in the axial direction and the axially-perpendicular direction (the extending direction of the extended portion 11b of the inner plate 11) can act on the elastomer member 12 (the first elastomer member 12a and the second elastomer member 12b).

Therefore, also in accordance with these, the precompressed status in the elastomer member 12 (the first elastomer member 12a and the second elastomer member 12b) can be properly changed for every locations (every directions), and the elastic force (spring constant) which the elastomer member 12 (the first elastomer member 12a and the second elastomer member 12b) generates can be arbitrarily changed. Other effects are the same as the above-mentioned embodiment and the above-mentioned first modification.

<Third Modification>

Figure 5:
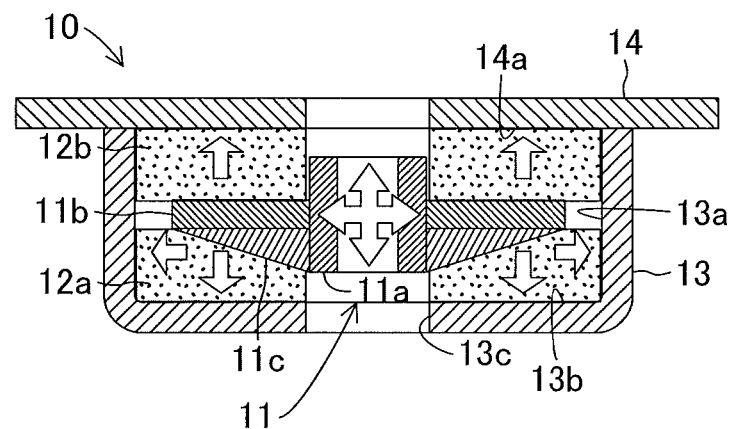
FIG. 5 is a view for explaining a configuration (one side configuration) of an incline portion in an inner plate, according to the third modification of the embodiment of the present invention.
Figure 5:
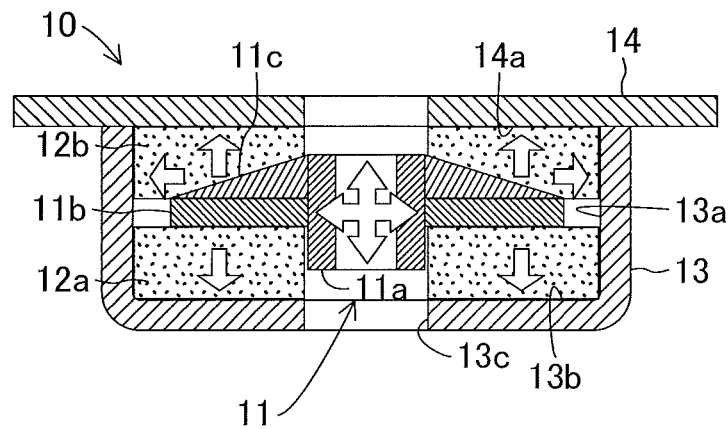

In the above-mentioned embodiment and the above-mentioned first and second modifications, the incline portion 11c which constitutes a compressing measure is formed on both the back and front sides opposed to both the first elastomer member 12a and the second elastomer member 12b of the extended portion 11b of the inner plate 11. In this case, depending on the characteristic demanded, as shown in FIG. 5 (a), for example, in the extended portion 11b of the inner plate 11, it is also possible to form the incline portion 11c only on one side opposed to the first elastomer member 12a. That is, in this case, the compressive load in the axial direction and the axially-perpendicular direction (the extending direction of the extended portion 11b of the inner plate 11) can act only on the first elastomer member 12a. Alternatively, as shown in FIG. 5 (b), in the extended portion 11b of the inner plate 11, it is also possible to form the incline portion 11c only on the one side opposed to the second elastomer member 12b. That is, in this case, the compressive load in the axial direction and the axially-perpendicular direction (the extending direction of the extended portion 11b of the inner plate 11) can act only on the second elastomer member 12b.

By the way, when the incline portion 11c which is formed on the extended portion 11b of the inner plate 11 is formed to be thus opposed to only one of the first elastomer member 12a and the second elastomer members 12b, there is a possibility that the elastic force (spring constant) generated in the axially-perpendicular direction of the inner plate 11 (more particularly, the shock absorber A connected therewith) (the extending direction of the extended portion 11b of the inner plate 11) may become small as compared with that in the above-mentioned embodiment and the first and second modifications. Therefore, in this case, it is also possible to form the lower case side incline portion 13d as a case member side incline portion or the upper case side incline portion 14b as a plate member side incline portion on the bottom inner surface 13b of the lower case 13 or the compression surface 14a of the upper plate 14, and to constitute a pressing measure including these lower case side incline portions 13d or (and) upper case side incline portion 14b.

Figure 6:
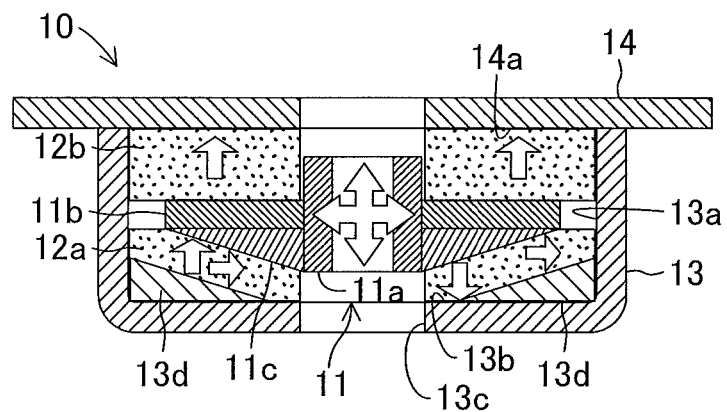
FIG. 6 is a view for explaining an arrangement of a lower case side incline portion and an upper plate side incline portion in a lower case and an upper plate, according to the third modification of the embodiment of the present invention.
Figure 6:
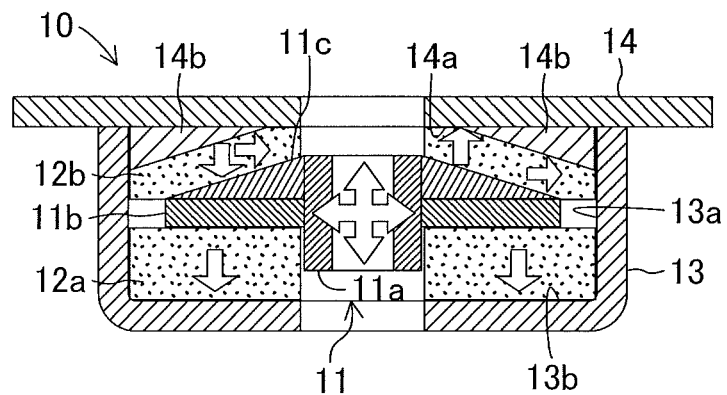

Specifically, in the extended portion 11b of the inner plate 11, when forming the incline portion 11c only on one side opposed to the first elastomer member 12a, in other words, only on one side opposed to the bottom inner surface 13b of the lower case 13, the lower case side incline portion 13d can be formed on the bottom inner surface 13b of the lower case 13, as shown in FIG. 6 (a). This lower case side incline portion 13d is formed in a tapered shape, around the whole circumference of the bottom inner surface 13b of the lower case 13, with a thickness increasing towards the outer edge of the extended portion 11b in the extending direction of the extended portion 11b of the inner plate 11, i.e., outwards in a radial direction from the center of the bottom inner surface 13b of the lower case 13. Thus, by forming the lower case side incline portion 13d in addition to that formation of the incline portion 11c on the extended portion 11b so as to be opposed to the first elastomer member 12a, the elastic force (spring constant) generated in the axially-perpendicular direction (the extending direction of the extended portion 11b of the inner plate 11) can be effectively increased.

Moreover, in the extended portion 11b of the inner plate 11, when forming the incline portion 11c only on one side opposed to the second elastomer member 12b, in other words, only on one side opposed to the compression surface 14a of the upper plate 14, the upper plate side incline portion 14b can be formed on the compression surface 14a of the upper plate 14, as shown in FIG. 6 (b). This upper plate side incline portion 14b is formed in a tapered shape, around the whole circumference of the compression surface 14a of the upper plate 14, with a thickness increasing towards the outer edge of the extended portion 11b in the extending direction of the extended portion 11b of the inner plate 11, i.e., outwards in a radial direction from the center of the compression surface 14a of the upper plate 14. Thus, by forming the upper plate side incline portion 14b in addition to that formation of the incline portion 11c on the extended portion 11b so as to be opposed to the second elastomer member 12b, the elastic force (spring constant) generated in the axially-perpendicular direction (the extending direction of the extended portion 11b of the inner plate 11) can be effectively increased.

Figure 7:
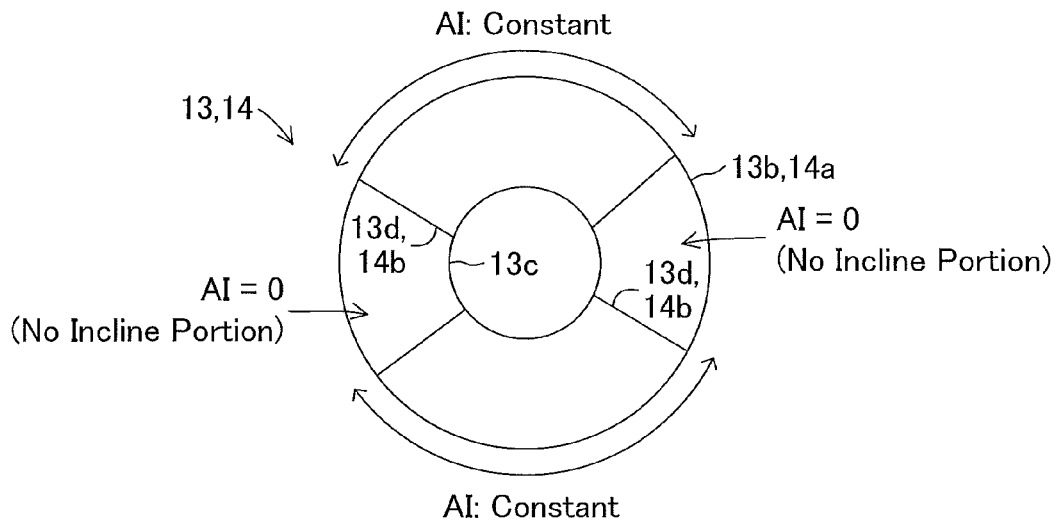
FIG. 7 is a view for explaining an arrangement of a lower case side incline portion and an upper plate side incline portion (presence or absence of an incline portion) and a continuous change of the angle of inclination of the incline portion, according to the third modification of the embodiment of the present invention.
Figure 7:
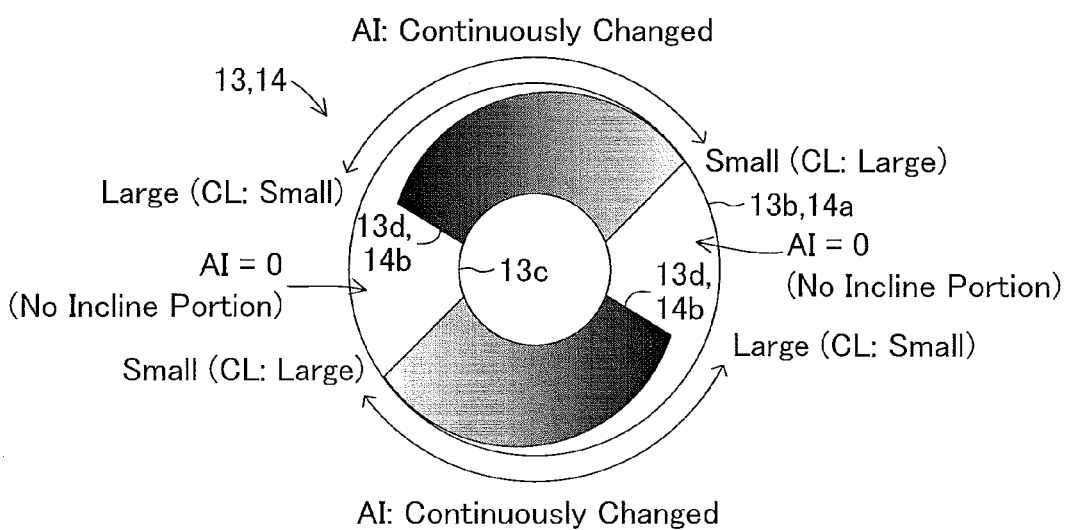
Figure 8:
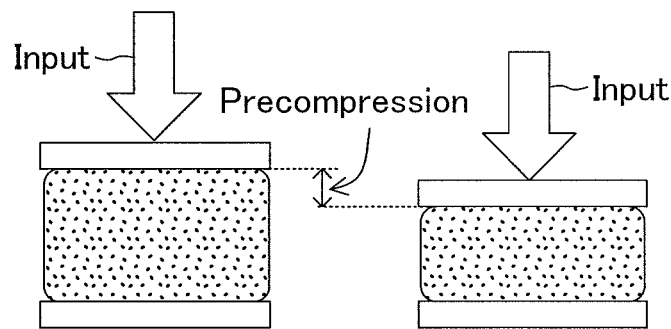
FIG. 8 is a view for explaining a change of a generation status of an elastic force in accordance with the presence or absence of a precompression in an elastomeric material (urethane).
Figure 8:
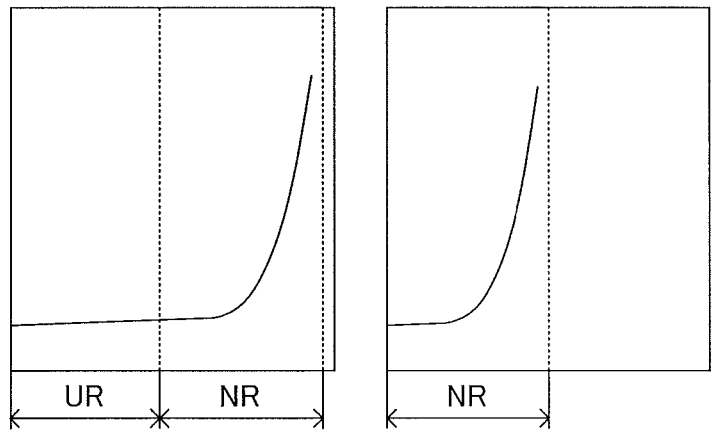
Figure 9:
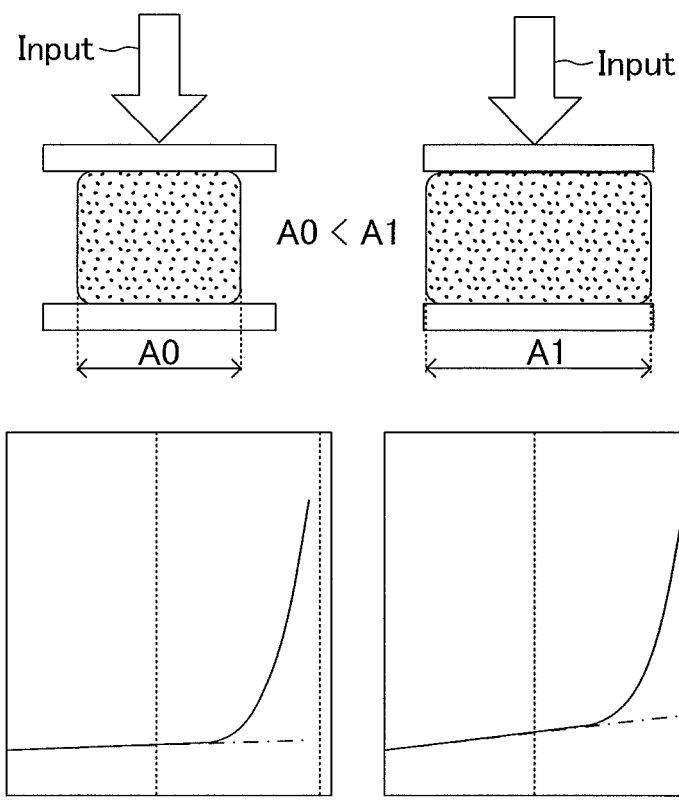
FIG. 9 is a view for explaining a change of a generation status of an elastic force in accordance with a change of a pressure receiving area in an elastomeric material (urethane).

Therefore, also in this third modification, the same effects as those of the above-mentioned embodiment and the above-mentioned first and second modifications can be expected. In addition, as for the lower case side incline portion 13d or the upper plate side incline portion 14b formed in accordance with this third modification, similarly to the above-mentioned second modification, it is also possible to form in an arbitrary location on the circumference of the circular bottom inner surface 13b of the lower case 13 or the circular compression surface 14b of the upper plate 14, as shown in FIG. 7 (a), for example. Moreover, as for the angle of inclination of the lower case side incline portion 13d or the upper plate side incline portion 14b, similarly to the above-mentioned first and second modifications, it is also possible to form the lower case side incline portion 13d or the upper plate side incline portion 14b in an arbitrary location on the circumference and to continuously change the angle of inclination of these lower case side incline portions 13d or the upper plate side incline portion 14b in the circumference direction, as shown in FIG. 7 (b), for example.

Also in accordance with these, the precompressed status in the elastomer member 12 (the first elastomer member 12a and the second elastomer member 12b) can be properly changed for every locations (every directions). Therefore, the elastic force (spring constant) which the elastomer member 12 (the first elastomer member 12a and the second elastomer member 12b) generates can be arbitrarily changed.

Implementation of the present invention is not limited to the above-mentioned embodiment and each modification, and various modifications are possible, unless it deviates from the objectives of the present invention.

For example, in the above-mentioned embodiment, the incline portion 11c was formed on both back and front sides of the extended portion 11b of the inner plate 11. In this case, it is also possible to further form the lower case side incline portion 13d on the bottom inner surface 13b of the lower case 13, or to further form the upper plate side incline portion 14b on the compression surface 14a of the upper plate 14. Moreover, in the above-mentioned third modification, corresponding to the incline portion 11c formed on the extended portion 11b of the inner plate 11, the lower case side incline portion 13d or the upper plate side incline portion 14b was formed. In this case, it is also possible to form the upper plate side incline portion 14b or the lower case side incline portion 13d also on the side where the incline portion 11c is not formed.

Also in these cases, the elastomer member 12 (the first elastomer member 12a and the second elastomer member 12b) can be precompressed by generating a compressive load also in the axially-predetermined direction while generating a compressive load in the axial direction. Thereby, when the shock absorber A connected with the vehicle body B through the suspension mount 10 is displaced in the up-and-down, left-and-right and front-and-rear directions of the vehicle, a desired elastic force can be given with a sufficient responsibility, a displacement of the shock absorber A can be properly controlled, and a desired characteristic can be demonstrated.

The invention claimed is:

1. A suspension mount which connects with a vehicle body a suspension member constituting a suspension mechanism of the vehicle, said suspension mount comprising:
    an inside member connected with said suspension member,
    an expandable resin elastomer formed of an expandable resin and which clamps an extended portion extended from said inside member,
    a case member which has a containing portion for integrally containing said inside member and said expandable resin elastomer,
    a plate member which is integrally adhered to an opening end of said case member and has a compression surface for compressing said expandable resin elastomer contained inside of said containing portion of said case member, along with a bottom inner surface of said case member, in a state that said expandable resin elastomer clamps said extended portion of said inside member, and
    a compressing measure for compressing said expandable resin elastomer in an extending direction of said extended portion of said inside member in association with the compression of said expandable resin elastomer by said bottom inner surface of said case member and said compression surface of said plate member,
    wherein said compressing measure is configured to comprise an incline portion formed at least on one side of clamped surfaces of said extended portion of said inside member, which are clamped by said expandable resin elastomer, wherein said incline portion is formed so that its thickness becomes thinner towards the outer edge of said extended portion in an extending direction of said extended portion.

2. The suspension mount according to claim 1, wherein:
    in a case where said incline portion is formed at least on the clamped surface opposed to said compression surface of said plate member among said clamped surfaces of said extended portion,
    said compressing measure is configured to further comprise a plate member side incline portion formed on said compression surface of said plate member.

3. The suspension mount according to claim 2, wherein:
said plate member side incline portion is formed so that its thickness becomes thicker towards the outer edge of said extended portion in an extending direction of said extended portion.

4. The suspension mount according to claim 1, wherein:
in a case where said incline portion is formed at least on the clamped surface opposed to said bottom inner surface of said case member among said clamped surfaces of said extended portion,
said compressing measure is configured to further comprise a case member side incline portion formed on said bottom inner surface of said case member.

5. The suspension mount according to claim 4, wherein:
said case member side incline portion is formed so that its thickness becomes thicker towards the outer edge of said extended portion, to which said case member side incline portion is opposed, in an extending direction of said extended portion.

6. The suspension mount according to claim 1, wherein:
said compressing measure compresses said expandable resin elastomer to different compression states along the circumference direction of said inside member.

7. The suspension mount according to claim 1, wherein:
said suspension member is a shock absorber and said inside member is connected with an absorber rod of the shock absorber.

* * * * *